(12) United States Patent
Weber

(10) Patent No.: US 9,846,861 B2
(45) Date of Patent: Dec. 19, 2017

(54) UPSTREAM AND DOWNSTREAM DATA CONVERSION

(71) Applicant: Visa International Service Association, San Francisco, CA (US)

(72) Inventor: Lance Weber, Boulder, CO (US)

(73) Assignee: Visa International Service Association, San Francisco, CA (US)

( * ) Notice: Subject to any disclaimer, the term of this patent is extended or adjusted under 35 U.S.C. 154(b) by 440 days.

(21) Appl. No.: 13/786,338

(22) Filed: Mar. 5, 2013

(65) Prior Publication Data

US 2014/0032418 A1    Jan. 30, 2014

Related U.S. Application Data

(60) Provisional application No. 61/675,746, filed on Jul. 25, 2012.

(51) Int. Cl.
*G06Q 20/08* (2012.01)
*G06Q 20/12* (2012.01)
*G06Q 20/38* (2012.01)

(52) U.S. Cl.
CPC ........... *G06Q 20/085* (2013.01); *G06Q 20/12* (2013.01); *G06Q 20/385* (2013.01)

(58) Field of Classification Search
CPC ................................ G06C 20/00; G06C 20/12
USPC .......................................................... 705/77
See application file for complete search history.

(56) References Cited

U.S. PATENT DOCUMENTS

| 5,613,012 A | 3/1997 | Hoffman |
| 5,781,438 A | 7/1998 | Lee |
| 5,883,810 A | 3/1999 | Franklin |
| 5,953,710 A | 9/1999 | Fleming |

(Continued)

FOREIGN PATENT DOCUMENTS

| EP | 2156397 A1 | 2/2010 |
| KR | 10-2006-0124375 A | 12/2006 |

(Continued)

OTHER PUBLICATIONS

International Preliminary Report on Patentability dated Feb. 5, 2015 for International Application No. PCT/US2013/046856, 6 pages.

(Continued)

*Primary Examiner* — Jagdish N Patel
*Assistant Examiner* — Liz P Nguyen
(74) *Attorney, Agent, or Firm* — Kilpatrick Townsend & Stockton LLP

(57) ABSTRACT

One embodiment of the invention is directed to implementing a broker system to accept confidential information from upstream trading partners, retrieve tokens from the tokenization service, send tokens to the merchant ordering system, and forward confidential information to downstream trading partners. By using a broker system, the merchant ordering system could store and use tokens to identify orders in its system instead of confidential information, which can help protect the confidential information in the event of a security breach. Also, the broker system may provide an amenable solution for the merchant to continue doing business with the upstream and downstream trading partners without causing these entities to substantially change their current processing systems.

23 Claims, 10 Drawing Sheets

(56) References Cited

U.S. PATENT DOCUMENTS

| | | |
|---|---|---|
| 5,956,699 A | 9/1999 | Wong |
| 6,000,832 A | 12/1999 | Franklin |
| 6,014,635 A | 1/2000 | Harris |
| 6,044,360 A | 3/2000 | Picciallo |
| 6,163,771 A | 12/2000 | Walker |
| 6,227,447 B1 | 5/2001 | Campisano |
| 6,236,981 B1 | 5/2001 | Hill |
| 6,267,292 B1 | 7/2001 | Walker |
| 6,327,578 B1 | 12/2001 | Linehan |
| 6,341,724 B2 | 1/2002 | Campisano |
| 6,385,596 B1 | 5/2002 | Wiser |
| 6,422,462 B1 | 7/2002 | Cohen |
| 6,425,523 B1 | 7/2002 | Shem Ur |
| 6,592,044 B1 | 7/2003 | Wong |
| 6,636,833 B1 | 10/2003 | Flitcroft |
| 6,748,367 B1 | 6/2004 | Lee |
| 6,805,287 B2 | 10/2004 | Bishop |
| 6,879,965 B2 | 4/2005 | Fung |
| 6,891,953 B1 | 5/2005 | DeMello |
| 6,901,387 B2 | 5/2005 | Wells |
| 6,931,382 B2 | 8/2005 | Laage |
| 6,938,019 B1 | 8/2005 | Uzo |
| 6,941,285 B2 | 9/2005 | Sarcanin |
| 6,980,670 B1 | 12/2005 | Hoffman |
| 6,990,470 B2 | 1/2006 | Hogan |
| 6,991,157 B2 | 1/2006 | Bishop |
| 7,051,929 B2 | 5/2006 | Li |
| 7,069,249 B2 | 6/2006 | Stolfo |
| 7,103,576 B2 | 9/2006 | Mann, III |
| 7,113,930 B2 | 9/2006 | Eccles |
| 7,136,835 B1 | 11/2006 | Flitcroft |
| 7,177,835 B1 | 2/2007 | Walker |
| 7,177,848 B2 | 2/2007 | Hogan |
| 7,194,437 B1 | 3/2007 | Britto |
| 7,264,154 B2 | 9/2007 | Harris |
| 7,287,692 B1 | 10/2007 | Patel |
| 7,292,999 B2 | 11/2007 | Hobson |
| 7,350,230 B2 | 3/2008 | Forrest |
| 7,353,382 B2 | 4/2008 | Labrou |
| 7,379,919 B2 | 5/2008 | Hogan |
| RE40,444 E | 7/2008 | Linehan |
| 7,415,443 B2 | 8/2008 | Hobson |
| 7,444,676 B1 | 10/2008 | Asghari-Kamrani |
| 7,469,151 B2 | 12/2008 | Khan |
| 7,548,889 B2 | 6/2009 | Bhambri |
| 7,567,934 B2 | 7/2009 | Flitcroft |
| 7,567,936 B1 | 7/2009 | Peckover |
| 7,571,139 B1 | 8/2009 | Giordano |
| 7,571,142 B1 | 8/2009 | Flitcroft |
| 7,580,898 B2 | 8/2009 | Brown |
| 7,584,153 B2 | 9/2009 | Brown |
| 7,593,896 B1 | 9/2009 | Flitcroft |
| 7,606,560 B2 | 10/2009 | Labrou |
| 7,627,531 B2 | 12/2009 | Breck |
| 7,627,895 B2 | 12/2009 | Gifford |
| 7,650,314 B1 | 1/2010 | Saunders |
| 7,685,037 B2 | 3/2010 | Reiners |
| 7,702,578 B2 | 4/2010 | Fung |
| 7,707,120 B2 | 4/2010 | Dominguez |
| 7,712,655 B2 | 5/2010 | Wong |
| 7,734,527 B2 | 6/2010 | Uzo |
| 7,753,265 B2 | 7/2010 | Harris |
| 7,770,789 B2 | 8/2010 | Oder, II |
| 7,784,685 B1 | 8/2010 | Hopkins, III |
| 7,793,851 B2 | 9/2010 | Mullen |
| 7,801,826 B2 | 9/2010 | Labrou |
| 7,805,376 B2 | 9/2010 | Smith |
| 7,805,378 B2 | 9/2010 | Berardi |
| 7,828,220 B2 | 11/2010 | Mullen |
| 7,835,960 B2 | 11/2010 | Breck |
| 7,841,523 B2 | 11/2010 | Oder, II |
| 7,841,539 B2 | 11/2010 | Hewton |
| 7,844,550 B2 | 11/2010 | Walker |
| 7,849,020 B2 | 12/2010 | Johnson |
| 7,853,529 B1 | 12/2010 | Walker |
| 7,853,995 B2 | 12/2010 | Chow |
| 7,865,414 B2 | 1/2011 | Fung |
| 7,873,579 B2 | 1/2011 | Hobson |
| 7,873,580 B2 | 1/2011 | Hobson |
| 7,890,393 B2 | 2/2011 | Talbert |
| 7,891,563 B2 | 2/2011 | Oder, II |
| 7,896,238 B2 | 3/2011 | Fein |
| 7,922,082 B2 | 4/2011 | Muscato |
| 7,931,195 B2 | 4/2011 | Mullen |
| 7,938,318 B2 | 5/2011 | Fein |
| 7,954,705 B2 | 6/2011 | Mullen |
| 7,959,076 B1 | 6/2011 | Hopkins, III |
| 7,996,288 B1 | 8/2011 | Stolfo |
| 8,025,223 B2 | 9/2011 | Saunders |
| 8,046,256 B2 | 10/2011 | Chien |
| 8,060,448 B2 | 11/2011 | Jones |
| 8,060,449 B1 | 11/2011 | Zhu |
| 8,074,877 B2 | 12/2011 | Mullen |
| 8,074,879 B2 | 12/2011 | Harris |
| 8,082,210 B2 | 12/2011 | Hansen |
| 8,095,113 B2 | 1/2012 | Kean |
| 8,104,679 B2 | 1/2012 | Brown |
| RE43,157 E | 2/2012 | Bishop |
| 8,109,436 B1 | 2/2012 | Hopkins, III |
| 8,121,942 B2 | 2/2012 | Carlson |
| 8,121,956 B2 | 2/2012 | Carlson |
| 8,126,449 B2 | 2/2012 | Beenau |
| 8,171,525 B1 | 5/2012 | Pelly |
| 8,190,523 B2 | 5/2012 | Patterson |
| 8,196,813 B2 | 6/2012 | Vadhri |
| 8,205,791 B2 | 6/2012 | Randazza |
| 8,224,702 B2 | 7/2012 | Mengerink |
| 8,225,385 B2 | 7/2012 | Chow |
| 8,265,993 B2 | 9/2012 | Chien |
| 8,280,777 B2 | 10/2012 | Mengerink |
| 8,328,095 B2 | 12/2012 | Oder, II |
| 8,376,225 B1 | 2/2013 | Hopkins, III |
| 8,380,177 B2 | 2/2013 | Laracey |
| 8,387,873 B2 | 3/2013 | Saunders |
| 8,401,539 B2 | 3/2013 | Beenau |
| 8,401,898 B2 | 3/2013 | Chien |
| 8,402,555 B2 | 3/2013 | Grecia |
| 8,403,211 B2 | 3/2013 | Brooks |
| 8,412,623 B2 | 4/2013 | Moon |
| 8,412,837 B1 | 4/2013 | Emigh |
| 8,417,642 B2 | 4/2013 | Oren |
| 8,447,699 B2 | 5/2013 | Batada |
| 8,453,223 B2 | 5/2013 | Svigals |
| 8,453,925 B2 | 6/2013 | Fisher |
| 8,458,487 B1 | 6/2013 | Palgon |
| 8,484,134 B2 | 7/2013 | Hobson |
| 8,485,437 B2 | 7/2013 | Mullen |
| 8,494,959 B2 | 7/2013 | Hathaway |
| 8,498,908 B2 | 7/2013 | Mengerink |
| 8,504,478 B2 | 8/2013 | Saunders |
| 8,510,816 B2 | 8/2013 | Quach |
| 8,533,860 B1 | 9/2013 | Grecia |
| 8,538,845 B2 | 9/2013 | Liberty |
| 8,555,079 B2 | 10/2013 | Shablygin |
| 8,566,168 B1 | 10/2013 | Bierbaum |
| 8,567,670 B2 | 10/2013 | Stanfield |
| 8,571,939 B2 | 10/2013 | Lindsey |
| 8,577,336 B2 | 11/2013 | Mechaley, Jr. |
| 8,577,803 B2 | 11/2013 | Chatterjee |
| 8,578,176 B2 | 11/2013 | Mattsson |
| 8,583,494 B2 | 11/2013 | Fisher |
| 8,584,251 B2 | 11/2013 | McGuire |
| 8,589,237 B2 | 11/2013 | Fisher |
| 8,589,271 B2 | 11/2013 | Evans |
| 8,589,291 B2 | 11/2013 | Carlson |
| 8,595,098 B2 | 11/2013 | Starai |
| 8,595,812 B2 | 11/2013 | Bomar |
| 8,595,850 B2 | 11/2013 | Spies |
| 8,606,638 B2 | 12/2013 | Dragt |
| 8,606,700 B2 | 12/2013 | Carlson |
| 8,606,720 B1 | 12/2013 | Baker |
| 8,615,468 B2 | 12/2013 | Varadarajan |
| 8,620,754 B2 | 12/2013 | Fisher |
| 8,635,157 B2 | 1/2014 | Smith |

(56) References Cited

U.S. PATENT DOCUMENTS

| | | |
|---|---|---|
| 8,646,059 B1 | 2/2014 | Von Behren |
| 8,651,374 B2 | 2/2014 | Brabson |
| 8,656,180 B2 | 2/2014 | Shablygin |
| 8,751,391 B2 | 6/2014 | Freund |
| 8,887,308 B2 | 11/2014 | Grecia |
| 2001/0029485 A1 | 10/2001 | Brody |
| 2001/0034720 A1 | 10/2001 | Armes |
| 2001/0054003 A1 | 12/2001 | Chien |
| 2002/0007320 A1 | 1/2002 | Hogan |
| 2002/0016749 A1 | 2/2002 | Borecki |
| 2002/0029193 A1 | 3/2002 | Ranjan |
| 2002/0035548 A1 | 3/2002 | Hogan |
| 2002/0073045 A1 | 6/2002 | Rubin |
| 2002/0116341 A1 | 8/2002 | Hogan |
| 2002/0133467 A1 | 9/2002 | Hobson |
| 2002/0147913 A1 | 10/2002 | Lun Yip |
| 2003/0028481 A1 | 2/2003 | Flitcroft |
| 2003/0130955 A1 | 7/2003 | Hawthorne |
| 2003/0191709 A1 | 10/2003 | Elston |
| 2003/0191945 A1 | 10/2003 | Keech |
| 2004/0010462 A1 | 1/2004 | Moon |
| 2004/0050928 A1 | 3/2004 | Bishop |
| 2004/0059682 A1 | 3/2004 | Hasumi |
| 2004/0093281 A1 | 5/2004 | Silverstein |
| 2004/0139008 A1 | 7/2004 | Mascavage |
| 2004/0143532 A1 | 7/2004 | Lee |
| 2004/0158532 A1 | 8/2004 | Breck |
| 2004/0210449 A1 | 10/2004 | Breck |
| 2004/0210498 A1 | 10/2004 | Freund |
| 2004/0232225 A1 | 11/2004 | Bishop |
| 2004/0260646 A1 | 12/2004 | Berardi |
| 2005/0037735 A1 | 2/2005 | Coutts |
| 2005/0080730 A1 | 4/2005 | Sorrentino |
| 2005/0108178 A1 | 5/2005 | York |
| 2005/0199709 A1 | 9/2005 | Linlor |
| 2005/0246293 A1 | 11/2005 | Ong |
| 2005/0256802 A1* | 11/2005 | Ammermann ......... G06Q 20/02 705/44 |
| 2005/0269401 A1 | 12/2005 | Spitzer |
| 2005/0269402 A1 | 12/2005 | Spitzer |
| 2006/0235795 A1 | 10/2006 | Johnson |
| 2006/0237528 A1 | 10/2006 | Bishop |
| 2006/0278704 A1 | 12/2006 | Saunders |
| 2007/0107044 A1 | 5/2007 | Yuen |
| 2007/0129955 A1 | 6/2007 | Dalmia |
| 2007/0136193 A1 | 6/2007 | Starr |
| 2007/0136211 A1 | 6/2007 | Brown |
| 2007/0170247 A1 | 7/2007 | Friedman |
| 2007/0179885 A1 | 8/2007 | Bird |
| 2007/0208671 A1 | 9/2007 | Brown |
| 2007/0245414 A1 | 10/2007 | Chan |
| 2007/0288377 A1 | 12/2007 | Shaked |
| 2007/0291995 A1 | 12/2007 | Rivera |
| 2008/0015988 A1 | 1/2008 | Brown |
| 2008/0029607 A1 | 2/2008 | Mullen |
| 2008/0035738 A1 | 2/2008 | Mullen |
| 2008/0052226 A1 | 2/2008 | Agarwal |
| 2008/0054068 A1 | 3/2008 | Mullen |
| 2008/0054079 A1 | 3/2008 | Mullen |
| 2008/0054081 A1 | 3/2008 | Mullen |
| 2008/0065554 A1 | 3/2008 | Hogan |
| 2008/0065555 A1 | 3/2008 | Mullen |
| 2008/0201264 A1 | 8/2008 | Brown |
| 2008/0201265 A1 | 8/2008 | Hewton |
| 2008/0228646 A1 | 9/2008 | Myers |
| 2008/0243702 A1 | 10/2008 | Hart |
| 2008/0245855 A1 | 10/2008 | Fein |
| 2008/0245861 A1 | 10/2008 | Fein |
| 2008/0283591 A1 | 11/2008 | Oder, II |
| 2008/0302869 A1 | 12/2008 | Mullen |
| 2008/0302876 A1 | 12/2008 | Mullen |
| 2008/0313264 A1 | 12/2008 | Pestoni |
| 2009/0006262 A1 | 1/2009 | Brown |
| 2009/0010488 A1 | 1/2009 | Matsuoka |
| 2009/0037333 A1 | 2/2009 | Flitcroft |
| 2009/0037388 A1 | 2/2009 | Cooper |
| 2009/0043702 A1 | 2/2009 | Bennett |
| 2009/0048971 A1 | 2/2009 | Hathaway |
| 2009/0106112 A1 | 4/2009 | Dalmia |
| 2009/0106160 A1 | 4/2009 | Skowronek |
| 2009/0134217 A1 | 5/2009 | Flitcroft |
| 2009/0157555 A1 | 6/2009 | Biffle |
| 2009/0159673 A1 | 6/2009 | Mullen |
| 2009/0159700 A1 | 6/2009 | Mullen |
| 2009/0159707 A1 | 6/2009 | Mullen |
| 2009/0173782 A1 | 7/2009 | Muscato |
| 2009/0200371 A1 | 8/2009 | Kean |
| 2009/0248583 A1 | 10/2009 | Chhabra |
| 2009/0276347 A1 | 11/2009 | Kargman |
| 2009/0294527 A1 | 12/2009 | Brabson |
| 2009/0307139 A1 | 12/2009 | Mardikar |
| 2009/0308921 A1 | 12/2009 | Mullen |
| 2009/0327131 A1 | 12/2009 | Beenau |
| 2010/0008535 A1 | 1/2010 | Abulafia |
| 2010/0088237 A1 | 4/2010 | Wankmueller |
| 2010/0094755 A1 | 4/2010 | Kloster |
| 2010/0106644 A1 | 4/2010 | Annan |
| 2010/0120408 A1 | 5/2010 | Beenau |
| 2010/0133334 A1 | 6/2010 | Vadhri |
| 2010/0138347 A1 | 6/2010 | Chen |
| 2010/0145860 A1 | 6/2010 | Pelegero |
| 2010/0161433 A1 | 6/2010 | White |
| 2010/0185545 A1 | 7/2010 | Royyuru |
| 2010/0211505 A1 | 8/2010 | Saunders |
| 2010/0223186 A1 | 9/2010 | Hogan |
| 2010/0228668 A1 | 9/2010 | Hogan |
| 2010/0235284 A1 | 9/2010 | Moore |
| 2010/0258620 A1 | 10/2010 | Torreyson |
| 2010/0291904 A1 | 11/2010 | Musfeldt |
| 2010/0306076 A1 | 12/2010 | Taveau |
| 2010/0325041 A1 | 12/2010 | Berardi |
| 2011/0010292 A1 | 1/2011 | Giordano |
| 2011/0016047 A1 | 1/2011 | Wu |
| 2011/0016320 A1 | 1/2011 | Bergsten |
| 2011/0029416 A1 | 2/2011 | Greenspan |
| 2011/0040640 A1 | 2/2011 | Erikson |
| 2011/0040967 A1 | 2/2011 | Waller |
| 2011/0083018 A1 | 4/2011 | Kesanupalli |
| 2011/0087596 A1 | 4/2011 | Dorsey |
| 2011/0093397 A1 | 4/2011 | Carlson |
| 2011/0125597 A1 | 5/2011 | Oder, II |
| 2011/0153437 A1 | 6/2011 | Archer |
| 2011/0154466 A1* | 6/2011 | Harper .................. G06F 21/335 726/9 |
| 2011/0161233 A1 | 6/2011 | Tieken |
| 2011/0191244 A1 | 8/2011 | Dai |
| 2011/0238511 A1 | 9/2011 | Park |
| 2011/0238573 A1 | 9/2011 | Varadarajan |
| 2011/0246317 A1 | 10/2011 | Coppinger |
| 2011/0272471 A1 | 11/2011 | Mullen |
| 2011/0272478 A1 | 11/2011 | Mullen |
| 2011/0276380 A1 | 11/2011 | Mullen |
| 2011/0276381 A1 | 11/2011 | Mullen |
| 2011/0276424 A1 | 11/2011 | Mullen |
| 2011/0276425 A1 | 11/2011 | Mullen |
| 2011/0295745 A1 | 12/2011 | White |
| 2011/0302081 A1 | 12/2011 | Saunders |
| 2012/0028609 A1 | 2/2012 | Hruska |
| 2012/0030047 A1 | 2/2012 | Fuentes |
| 2012/0035998 A1 | 2/2012 | Chien |
| 2012/0036075 A1* | 2/2012 | Klein .................... G06Q 20/16 705/64 |
| 2012/0041881 A1* | 2/2012 | Basu .................... G06Q 20/02 705/67 |
| 2012/0047237 A1 | 2/2012 | Arvidsson |
| 2012/0066078 A1 | 3/2012 | Kingston |
| 2012/0072350 A1 | 3/2012 | Goldthwaite |
| 2012/0078735 A1 | 3/2012 | Bauer |
| 2012/0078798 A1 | 3/2012 | Downing |
| 2012/0078799 A1 | 3/2012 | Jackson |
| 2012/0095852 A1 | 4/2012 | Bauer |
| 2012/0095865 A1 | 4/2012 | Doherty |
| 2012/0116902 A1 | 5/2012 | Cardina |
| 2012/0123882 A1 | 5/2012 | Carlson |

(56) References Cited

U.S. PATENT DOCUMENTS

| | | | |
|---|---|---|---|
| 2012/0123940 A1 | 5/2012 | Killian | |
| 2012/0129514 A1 | 5/2012 | Beenau | |
| 2012/0136798 A1 | 5/2012 | Navar | |
| 2012/0143767 A1 | 6/2012 | Abadir | |
| 2012/0143772 A1 | 6/2012 | Abadir | |
| 2012/0158580 A1 | 6/2012 | Eram | |
| 2012/0158593 A1 | 6/2012 | Garfinkle | |
| 2012/0173431 A1* | 7/2012 | Ritchie | G06Q 20/367 705/65 |
| 2012/0185386 A1 | 7/2012 | Salama | |
| 2012/0197807 A1 | 8/2012 | Schlesser | |
| 2012/0203664 A1 | 8/2012 | Torossian | |
| 2012/0203666 A1 | 8/2012 | Torossian | |
| 2012/0215688 A1 | 8/2012 | Musser | |
| 2012/0215696 A1 | 8/2012 | Salonen | |
| 2012/0231844 A1 | 9/2012 | Coppinger | |
| 2012/0233004 A1 | 9/2012 | Bercaw | |
| 2012/0246070 A1 | 9/2012 | Vadhri | |
| 2012/0246071 A1 | 9/2012 | Jain | |
| 2012/0265631 A1 | 10/2012 | Cronic | |
| 2012/0271770 A1 | 10/2012 | Harris | |
| 2012/0297446 A1 | 11/2012 | Webb | |
| 2012/0300932 A1 | 11/2012 | Cambridge | |
| 2012/0303503 A1 | 11/2012 | Cambridge | |
| 2012/0303961 A1 | 11/2012 | Kean | |
| 2012/0304273 A1 | 11/2012 | Bailey | |
| 2012/0310725 A1 | 12/2012 | Chien | |
| 2012/0310831 A1 | 12/2012 | Harris | |
| 2012/0316992 A1 | 12/2012 | Oborne | |
| 2012/0317035 A1 | 12/2012 | Royyuru | |
| 2012/0317036 A1 | 12/2012 | Bower | |
| 2013/0017784 A1 | 1/2013 | Fisher | |
| 2013/0019098 A1 | 1/2013 | Gupta | |
| 2013/0031006 A1* | 1/2013 | McCullagh | G06Q 20/363 705/66 |
| 2013/0054337 A1 | 2/2013 | Brendell | |
| 2013/0054466 A1 | 2/2013 | Muscato | |
| 2013/0054474 A1 | 2/2013 | Yeager | |
| 2013/0081122 A1 | 3/2013 | Svigals | |
| 2013/0091028 A1 | 4/2013 | Oder, II | |
| 2013/0110658 A1 | 5/2013 | Lyman | |
| 2013/0111599 A1 | 5/2013 | Gargiulo | |
| 2013/0117185 A1 | 5/2013 | Collison | |
| 2013/0124290 A1 | 5/2013 | Fisher | |
| 2013/0124291 A1 | 5/2013 | Fisher | |
| 2013/0124364 A1 | 5/2013 | Mittal | |
| 2013/0138525 A1 | 5/2013 | Bercaw | |
| 2013/0144888 A1 | 6/2013 | Faith | |
| 2013/0145148 A1 | 6/2013 | Shablygin | |
| 2013/0145172 A1 | 6/2013 | Shablygin | |
| 2013/0159178 A1 | 6/2013 | Colon | |
| 2013/0166402 A1 | 6/2013 | Parento | |
| 2013/0166456 A1 | 6/2013 | Zhang | |
| 2013/0173736 A1 | 7/2013 | Krzeminski | |
| 2013/0185202 A1 | 7/2013 | Goldthwaite | |
| 2013/0191286 A1 | 7/2013 | Cronic | |
| 2013/0191289 A1 | 7/2013 | Cronic | |
| 2013/0198071 A1 | 8/2013 | Jurss | |
| 2013/0200146 A1 | 8/2013 | Moghadam | |
| 2013/0204787 A1 | 8/2013 | Dubois | |
| 2013/0204793 A1 | 8/2013 | Kerridge | |
| 2013/0212007 A1 | 8/2013 | Mattsson | |
| 2013/0212017 A1 | 8/2013 | Bangia | |
| 2013/0212019 A1 | 8/2013 | Mattsson | |
| 2013/0212024 A1 | 8/2013 | Mattsson | |
| 2013/0212666 A1 | 8/2013 | Mattsson | |
| 2013/0218698 A1 | 8/2013 | Moon | |
| 2013/0226813 A1 | 8/2013 | Voltz | |
| 2013/0246202 A1 | 9/2013 | Tobin | |
| 2013/0246203 A1 | 9/2013 | Laracey | |
| 2013/0246258 A1 | 9/2013 | Dessert | |
| 2013/0246259 A1 | 9/2013 | Dessert | |
| 2013/0246267 A1 | 9/2013 | Tobin | |
| 2013/0254028 A1 | 9/2013 | Salci | |
| 2013/0254052 A1 | 9/2013 | Royyuru | |
| 2013/0254102 A1 | 9/2013 | Royyuru | |
| 2013/0254117 A1 | 9/2013 | Von Mueller | |
| 2013/0262296 A1 | 10/2013 | Thomas | |
| 2013/0262302 A1 | 10/2013 | Lettow | |
| 2013/0262315 A1 | 10/2013 | Hruska | |
| 2013/0262316 A1 | 10/2013 | Hruska | |
| 2013/0262317 A1 | 10/2013 | Collinge | |
| 2013/0275300 A1 | 10/2013 | Killian | |
| 2013/0275307 A1 | 10/2013 | Khan | |
| 2013/0275308 A1 | 10/2013 | Paraskeva | |
| 2013/0282502 A1 | 10/2013 | Jooste | |
| 2013/0282575 A1 | 10/2013 | Mullen | |
| 2013/0282588 A1 | 10/2013 | Hruska | |
| 2013/0297504 A1 | 11/2013 | Nwokolo | |
| 2013/0297508 A1 | 11/2013 | Belamant | |
| 2013/0304649 A1 | 11/2013 | Cronic | |
| 2013/0308778 A1 | 11/2013 | Fosmark | |
| 2013/0311382 A1 | 11/2013 | Fosmark | |
| 2013/0317982 A1 | 11/2013 | Mengerink | |
| 2013/0332344 A1 | 12/2013 | Weber | |
| 2013/0339253 A1 | 12/2013 | Sincai | |
| 2013/0346314 A1 | 12/2013 | Mogollon | |
| 2014/0007213 A1 | 1/2014 | Sanin | |
| 2014/0013106 A1 | 1/2014 | Redpath | |
| 2014/0013114 A1 | 1/2014 | Redpath | |
| 2014/0025581 A1 | 1/2014 | Calman | |
| 2014/0025585 A1 | 1/2014 | Calman | |
| 2014/0025958 A1 | 1/2014 | Calman | |
| 2014/0032417 A1 | 1/2014 | Mattsson | |
| 2014/0032418 A1 | 1/2014 | Weber | |
| 2014/0040137 A1 | 2/2014 | Carlson | |
| 2014/0040139 A1 | 2/2014 | Brudnicki | |
| 2014/0040144 A1 | 2/2014 | Plomske | |
| 2014/0040145 A1 | 2/2014 | Ozvat | |
| 2014/0040148 A1 | 2/2014 | Ozvat | |
| 2014/0040628 A1 | 2/2014 | Fort | |
| 2014/0041018 A1 | 2/2014 | Bomar | |
| 2014/0046853 A1 | 2/2014 | Spies | |
| 2014/0052532 A1 | 2/2014 | Tsai | |
| 2014/0052620 A1 | 2/2014 | Rogers | |
| 2014/0052637 A1 | 2/2014 | Jooste | |
| 2015/0032625 A1 | 1/2015 | Dill | |
| 2015/0032626 A1 | 1/2015 | Dill | |
| 2015/0032627 A1 | 1/2015 | Dill | |
| 2015/0046338 A1 | 2/2015 | Laxminarayanan | |

FOREIGN PATENT DOCUMENTS

| | | |
|---|---|---|
| KR | 10-2007-0115203 A | 12/2007 |
| WO | 2001035304 A1 | 5/2001 |
| WO | 2001035304 A9 | 5/2001 |
| WO | 2004042536 A2 | 5/2004 |
| WO | 2006113834 A2 | 10/2006 |
| WO | 2009032523 A1 | 3/2009 |
| WO | 2010078522 A1 | 7/2010 |
| WO | 2012068078 A2 | 5/2012 |
| WO | 2012098556 A1 | 7/2012 |
| WO | 2012142370 A2 | 10/2012 |
| WO | 2012167941 A1 | 12/2012 |
| WO | 2013048538 A1 | 4/2013 |
| WO | 2013056104 A1 | 4/2013 |
| WO | 2013119914 A1 | 8/2013 |
| WO | 2013179271 A2 | 12/2013 |

OTHER PUBLICATIONS

International Search Report and Written Opinion dated Sep. 27, 2013 in Application No. PCT/US2013/046856, 9 pages.

Petition for Inter Partes Review of U.S. Pat. No. 8,533,860 Challenging Claims 1-30 Under 35 U.S.C. § 312 and 37 C.F.R. § 42.104, filed Feb. 17, 2016, Before the USPTO Patent Trial and Appeal Board, IPR 2016-00600, 65 pages.

\* cited by examiner

Order Database 410

| Customer No. | Item | Description | Quantity | Price | Total |
|---|---|---|---|---|---|
| SMITH-J-1000 | TEL-1000 | Establish Telephone Lines | 5 | 1000.00 | 5000.00 |
| SMITH-J-1000 | POL-1000 | Establish Telephone Pole | 1 | 1000.00 | 1000.00 |

420

| Customer No. | Account Identifier | Expiration | CVV |
|---|---|---|---|
| SMITH-J-1000 | 4147 2900 0001 1000 | 08/2013 | 123 |

430

| Customer No. | Parties Involved | Token |
|---|---|---|
| SMITH-J-1000 | John Smith, Inc.; Merchant; Installer | 1234ABCD9876DCBA1234ABCD9876DCBA1234ABCD9876DCBA |

UPSTREAM AND DOWNSTREAM DATA CONVERSION

CROSS-REFERENCES TO RELATED APPLICATIONS

This application claims the benefit of U.S. Provisional Application No. 61/675,746, filed Jul. 25, 2012, entitled "Upstream and Downstream Data Conversion," which is hereby incorporated by reference in its entirety for all purposes.

BACKGROUND

Embodiments of the invention improve upon existing security systems and methods. In some existing security systems and methods, entities can use tokens instead of real account numbers to conduct payment transactions. A token can be a substitute for the real account number. For example, once a merchant receives a real account number identifier from a consumer, the merchant can submit the real account number to a tokenization service system and can subsequently receive a token in return. The merchant can use the token to process the consumer's order for goods instead of the real account number, and may store the token in a database. By using and storing the token and by not storing or using the real account number, data security is improved. That is, if the token is somehow obtained by an unauthorized person, it will be useless.

When a merchant accepts an order from another upstream merchant, the upstream merchant may only use real account numbers and not tokens. The upstream merchant may also store the real account number in its system and refer to the order using the real account number, instead of the token. However, when the merchant accepts the order from the upstream merchant in a business transaction, the merchant has trouble getting paid by the upstream merchant, because the upstream merchant does not wish to receive or store real account numbers. It would rather store tokens.

It would be desirable to provide for a system and method that can provide data security and efficient payment transactions to those entities that wish to use tokens, while allowing them to receive and make payments to entities that wish to use real account numbers to process payments, rather than tokens.

Embodiments of the invention address this and other problems, individually and collectively.

SUMMARY

Embodiments of the invention relate to providing a token broker to assist upstream trading partners, downstream trading partners, and merchant ordering systems communicate during an order or payment process using one or more order messages (e.g., a first, second, third, and fourth order message).

One embodiment of the invention is directed to a method that can receive, at a broker computer, an order message comprising an order and an account token, initiate a detokenization process to detokenize the account token and to form an account identifier, generate a subsequent order message with the order and account identifier, and transmit the subsequent order message to a downstream trading partner computer wherein the downstream trading partner computer initiates a payment transaction. The order may be a second order. The payment transaction may be a second payment transaction and the account token may be a second token. The order message may be a third order message and the subsequent order message may be a fourth order message. The method may also comprise receiving a first order message comprising a first order and the account identifier from an upstream trading partner computer, initiating a tokenization process to tokenize the account identifier and to form a second account token, generating a second order message with the first order and the second account token, and transmitting the second order message to a merchant ordering system wherein the merchant ordering system initiates a first payment transaction. The third order message may be received after the first order message. The account identifier may be decrypted. The method may further comprise, after forming the account identifier, encrypting the account identifier. The account identifier may be a primary account number. The broker computer may receive the third order message via a hosted webpage.

Another embodiment of the invention is directed to a method that may comprise generating, at a merchant ordering system, an order message comprising an order and an account token, and transmitting, to a broker computer, the order message, wherein the broker computer initiates a detokenization process to detokenize the account token and to form an account identifier, wherein the broker computer generates a subsequent order message with the order and account identifier, wherein the broker computer transmits the subsequent order message to a downstream trading partner computer, and wherein the downstream trading partner computer initiates a payment transaction.

Another embodiment of the invention is directed to an apparatus comprising a computer coupled to a database, wherein the computer comprises a processor and a computer-readable medium coupled to the processor, the computer-readable medium comprising code executable by the processor for implementing a method. The method may comprise receiving, at a broker computer, an order message comprising an order and an account token, initiating a detokenization process to detokenize the account token and to form an account identifier, generating a subsequent order message with the order and account identifier, and transmitting the subsequent order message to a downstream trading partner computer wherein the downstream trading partner computer initiates a payment transaction.

Another embodiment of the invention is directed to an apparatus comprising a computer coupled to a database, wherein the computer comprises a processor and a computer-readable medium coupled to the processor, the computer-readable medium comprising code executable by the processor for implementing a method. The method may comprise generating, at a merchant ordering system, an order message comprising an order and an account token, and transmitting, to a broker computer, the order message, wherein the broker computer initiates a detokenization process to detokenize the account token and to form an account identifier, wherein the broker computer generates a subsequent order message with the order and account identifier, wherein the broker computer transmits the subsequent order message to a downstream trading partner computer, and wherein the downstream trading partner computer initiates a payment transaction.

These and other embodiments of the invention are described in further detail below with reference to the Figures and the Detailed Description.

BRIEF DESCRIPTION OF THE DRAWINGS

FIG. 4 shows sample data contained in the order database according to an embodiment of the invention.

DETAILED DESCRIPTION

Figure 1:
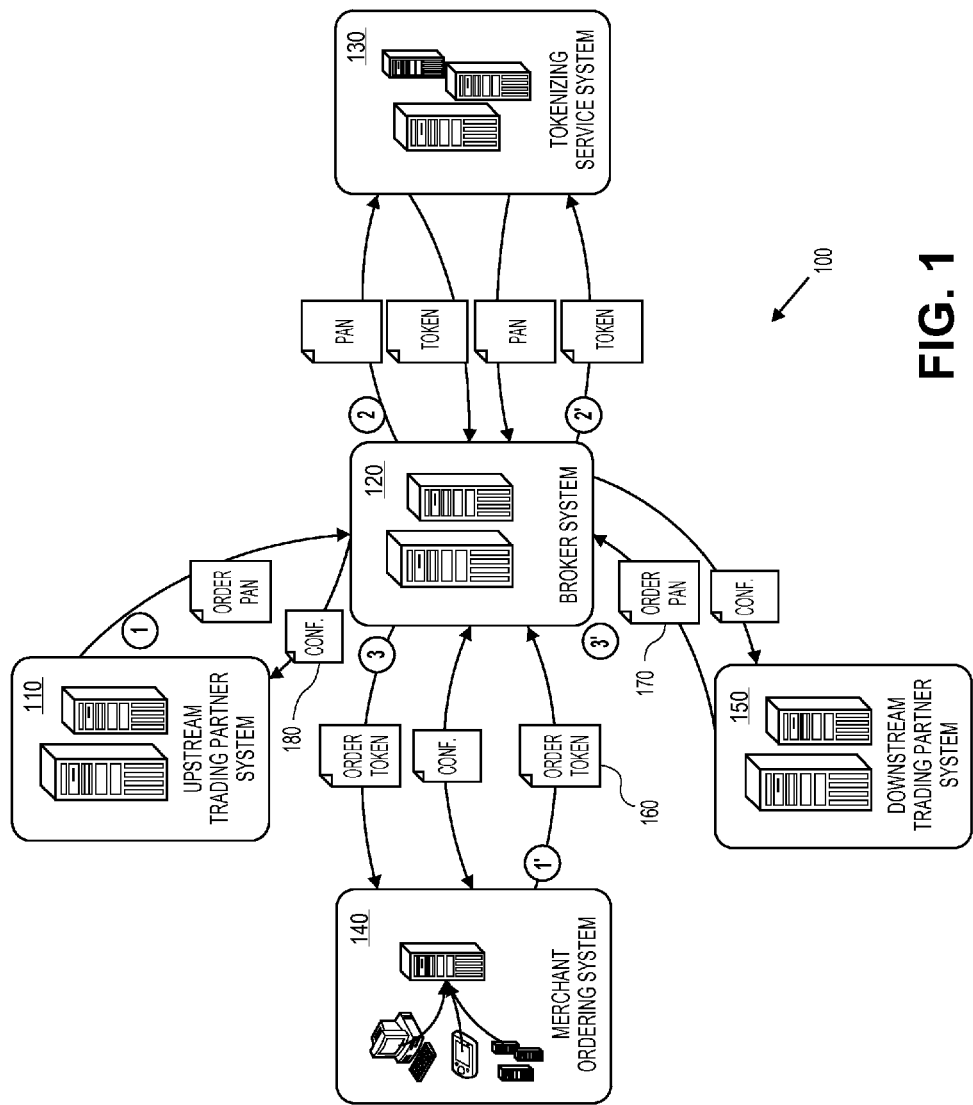
FIG. 1 shows a block diagram of a system according to an embodiment of the invention.

Prior to discussing the specific embodiments of the invention, a further description of some terms may be helpful for a better understanding of embodiments of the invention.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

A "merchant ordering system" may include one or more server computers that can process orders for merchants.

A "trading partner system" may include a server computer used by an entity that can interact with a merchant ordering system, either directly or through an intermediary. A trading partner system may be operated by an upstream or a downstream merchant (relative to another merchant). It can provide (e.g., transmit) or receive orders, tokens, and/or account identifiers to another merchant.

An "upstream trading partner" may include an entity that places orders for goods or services with a merchant. The upstream trading partner may operate an upstream trading partner system, which may comprise one or more computer apparatuses.

A "downstream trading partner" may include an entity that accepts orders for goods or services from a merchant. The upstream trading partner may operate an upstream trading partner system, which may comprise one or more computer apparatuses.

There are several situations where an upstream trading partner, merchant, and downstream trading partner may interact with each other. For example, the merchant may be a telecommunications company and an upstream trading partner may be a telemarketing company that wants to pay the telecommunications company to activate telephone lines. In this example, the upstream trading partner's system can electronically transmit an order to the merchant ordering system for the new telephone lines. A downstream trading partner may be a contractor that installs the telephone lines. In this case, the merchant can pay the downstream trading partner to install the telephone lines. The merchant can send an order via the merchant ordering system to the downstream trading partner system.

As another illustration, a merchant may be a billing consolidator and an upstream trading partner can provide several bills to the merchant to consolidate and/or settle. The upstream trading partner can provide funds to the merchant to pay one or more downstream trading partners on behalf of the upstream trading partner. These payments could be for goods or services provided by the downstream trading partner to the upstream trading partner.

As yet another illustration, an upstream trading partner may be a reseller in direct contact with a consumer. For example, the upstream trading partner may purchase goods or services from a downstream trading partner with the intention of reselling them to the consumer rather than consuming or using them. Once the upstream trading partner sells the good or service to the consumer, the upstream trading partner can submit the consumer's order, via the merchant ordering system, to a downstream trading partner who may have originally offered the good or service.

A "tokenization service system" may include a server computer that can convert an account identifier into an account token and an account token into an account identifier. In some embodiments, the tokenization service system can accept an account token from a broker system and send the corresponding account identifier back to the broker system, and vice-versa.

A "token" may include a substitute for a real account identifier. It may have any suitable form. For example, it may comprise a string of alphanumeric characters of any suitable length. In some cases, the token may have the same number of characters as a real account identifier.

A "broker system" can include a server computer that provides an interface for receiving and transmitting order messages. The broker system may be used by several systems, including a merchant ordering system, a trading partner system, and a tokenization service system. The broker system can facilitate the interactions between these systems. For example, the broker system may receive an order message with an account identifier from an upstream trading partner system and transmit a different order message with an account token to a merchant ordering system. In another example, the broker system may receive an order message with an account token from the merchant ordering system and transmit a different order message with an account identifier to a downstream trading partner system. The broker system can include a broker computer and a plurality of databases and modules.

A "hosted IFRAME" may include a website that can allow the creator to display a personalized webpage without designing, generating, or hosting the webpage on their own.

Embodiments of the invention are directed to assisting a merchant interact with its trading partners and other entities, even when the entities have not implemented tokenization in their systems. Specifically, embodiments of the invention provide a broker system. The broker system can assist the merchant ordering system with transmitting and receiving orders for goods and services using account tokens instead of account identifiers. The broker system can exchange the account identifiers with account tokens, and vice versa, using tokenization.

The merchant ordering system may process the order for the upstream trading partner and submit the order to a downstream trading partner by transmitting an order message. When the downstream trading partner also does not use tokens, the downstream trading partner system accepts orders that include confidential account identifiers, because the downstream trading partner may need to use the confidential account identifier in other processing (e.g., to submit a payment transaction). Thus, in order to interact with the downstream trading partner that does not utilize tokens, the merchant ordering system may store the confidential account identifiers to identify the order in its interactions with the downstream trading partner. In this instance, the upstream trading partner system, downstream trading partner system, and the merchant ordering system use account identifiers to track the order through the respective systems. The confidential account identifier may be stored in these systems at least during the order process and thus all three systems could be vulnerable to security breaches.

Comparatively, as advantageously shown in an embodiment of the invention, a broker system can be implemented to assist with interactions between the upstream trading partner system, downstream trading partner system, and the merchant ordering system. In the cases where one or more of the entities use confidential account identifiers instead of tokens, the broker system can help solve the disconnect between the entities that use tokens and the entities who use confidential account identifiers instead of tokens.

In an embodiment, the upstream trading partner system may initiate an order for goods or services with a merchant ordering system. In this illustration, the upstream trading partner system may not recognize tokens and might transmit an order message with a confidential account identifier. The broker system can accept the order on behalf of the merchant ordering system. The broker system or tokenization service system can convert the confidential account identifier to an account token and provide the account token to the merchant ordering system. The merchant ordering system may store the token as the primary means of identifying an order message. The merchant ordering system may process the order for the upstream trading partner and submit the order to a downstream trading partner. When the downstream trading partner also does not recognize tokens, the merchant ordering system may transmit the order with the account token to the broker system. The broker system or tokenization service system can convert the account token into a confidential account identifier and provide the order with the confidential account identifier to the downstream trading partner system as a different order message. In this instance, the upstream trading partner system and downstream trading partner system use account identifiers to track the order instead of tokens. However, by using the broker system or tokenization service system and not using account identifiers, the merchant ordering system helps to protect the consumer's confidential information by using tokens.

Advantageously, the merchant ordering system may be PCI compliant. The Payment Card Industry ("PCI") Data Security Standard includes suggestions for a baseline of technical and operational requirements designed to protect customers' payment data. Particularly, when merchants do business with upstream trading partners (e.g., an entity who pays the merchant) and downstream trading partners (e.g., an entity being paid by the merchant), PCI standards encourage the merchants and trading partners to implement data security in the entities' networks, including firewall configurations, passwords, suggested encryption standards, access rights, etc.

In another embodiment, the upstream trading partner may be holding payment information on behalf of a third party and the merchant ordering system may be a procurement card program, like the U.S. General Services Administration (GSA) program. The broker system can step in for the merchant to receive an order message for a new account. The broker system can tokenize the account identifier in the order message and forward the order message with a token to the billing consolidator merchant. The merchant may keep several million procurement cards under management in their procurement system as tokens. When the merchant needs to fulfill and order related to one of the tokens, the merchant ordering system can send the order message to the broker system. The broker system can convert the token to an account identifier and send the account identifier and order to the downstream trading partner for order fulfillment. When a tokenization system is not implemented, the merchant ordering system would hold a customer's account identifier (e.g., 16-digit primary account number) in order to purchase buy goods and services.

Embodiments of the invention have a number of advantages. The systems and methods according to embodiments of the invention can improve security and help protect the consumer payment information. For example, when a merchant stores tokens, but the upstream and/or downstream trading partner stores confidential information, the use of tokens at the merchant could improve the security with at least one entity in the transaction process. Additionally, embodiments of the invention facilitate transmissions and data exchanges between different systems as well. In some embodiments, the broker system can convert the tokens back to confidential account numbers for a downstream trading partner. Another advantage of the processes may allow the trading partners to continue to submit the account identifiers to the payment transaction process without amending their internal systems. A merchant may not need to store confidential information in its system simply to do business with an upstream trading partner who stores the confidential information instead of tokens. Systems and methods could allow entities to transmit information without substantially changing the entities' internal systems. Further, a merchant may remain PCI-compliant without jeopardizing its business relationship with non-compliant trading partners. Embodiments of the invention are more secure and efficient than conventional systems.

Generally, embodiments relate to apparatuses, systems, and methods of implementing a broker system to exchange account identifiers for account tokens, and vice versa. In particular, some embodiments may provide decryption and tokenization services in association with a payment transaction.

I. Exemplary Systems of Upstream and Downstream Data Conversion

FIG. 1 shows a block diagram of a system according to an embodiment of the invention. The system 100 may contain an upstream trading partner system 110, broker system 120, tokenization service system 130, merchant ordering system 140, and downstream trading partner system 150. The broker system 120 serves as a central hub, which connects the upstream trading partner system 110, the merchant ordering system 140, the downstream trading partner system 150, and the tokenization service system 130.

In an embodiment, the broker system 120 may be associated with a merchant associated with the merchant ordering system 140. The merchant ordering system 140 may register with the broker system 120.

A method for token exchange involving an upstream merchant can be now be described.

At step 1, the broker system 120 may receive an order message from an upstream trading partner system 110. The broker system 120 may be located (in an operational sense) between the upstream trading partner system 110, tokenization service system 130, merchant ordering system 140, and/or downstream trading partner system 150. The broker system 120 may include data processing subsystems, networks, and operations used to support and deliver tokenized account identifiers, confidential account identifiers, and other order information between the entities. The broker system 120 may be used to help exchange orders or other information between entities when some of the entities use tokens and others use confidential information to identify the order.

The broker system 120 may provide a host server page (e.g., hosted webpage) or a batch file system. The broker system 120 can also encrypt and decrypt data, in addition to forwarding or receiving tokens or confidential account identifiers with any computer or system.

The broker system 120 can serve as a proxy for the merchant ordering system to accept orders from the upstream trading partner system 110. These orders may include confidential account identifiers. The broker system 120 can forward the orders with a confidential account identifier to the tokenization service system 130, which can store the confidential account identifiers and generate tokens. The tokenization service system 130 can return the order with the token to the broker system 120.

In an embodiment, the broker system 120 receives a first order message comprising the order and account identifier from an upstream trading partner system 110. In some embodiments, the first order message may be received before the third order message, as explained below in relation to step 1'.

At step 2, the tokenization service system 130 receives a confidential account identifier (e.g., primary account number) from the broker system 120 that may have originated with the upstream trading partner 110. The tokenization service system 130 receives the confidential account identifier, and then subsequently provides the account token that relates to the confidential account identifier to the broker system 120.

At step 3, the broker system 120 can transmit a tokenized order to the merchant ordering system 140 on behalf of the upstream trading partner 110. The merchant ordering system 140 can process the order using the tokenized order information. The merchant ordering system 140 may not need to interact with or store the confidential account identifier because the broker system 120 or tokenization service system 130 stores the confidential account identifier.

In an embodiment, a second order message may be generated with the order and the account token. The second order message can be transmitted to a merchant ordering system to initiate a payment transaction.

In some embodiments, the broker system 120 may provide a hosted webpage for the merchant ordering system 140. The merchant ordering system 140 may transmit order messages to the broker system 120 via the webpage. For example, the broker system 120 can host the webpage to receive the third order message, which may include an order and an account token.

After the merchant associated with the merchant ordering system 140 has registered with a broker system 120, the merchant ordering system 140 can accept order messages that contain an order and a token from the broker system. The merchant ordering system 140 can also send order messages that contain orders and tokens to the broker system 120 so that the broker system 120 can forward the information to other entities, including an upstream trading partner, tokenization service, and downstream trading partner.

The broker system 120 may also keep track of the tokens (e.g., in a database). The broker system may also provide the information that the entities exchanged to the merchant ordering system 140 and trading partner systems. This may allow the entities to generate reports through the broker system 120 (e.g., by querying the information stored in the database).

At any step in the process, one or more systems may submit a reply message. The reply message 180 may comprise information related to the order, a confirmation of a successful order, or other information known in the art. In an embodiment, a merchant ordering system 140 transmits a reply message 180 to a broker system 120, which forwards the message to an upstream trading partner system 110 without substantial processing. An exemplary reply message is provided in FIG. 7.

A tokenization process involving a downstream merchant can now be described.

At step 1', the broker system 120 may receive a third order message from a merchant ordering system 140. In an embodiment, the third order message may be received after the first order message.

The third order message 160 may comprise an order and a token. In an embodiment, a merchant ordering system 140 transmits a third order message 160 to a broker system 120. An exemplary third order message is provided in FIG. 6.

At step 2', the tokenization service system 130 can accept the token from the broker system 120 and provide the confidential account identifier that relates to the account token to the broker system 120.

At step 3', the broker system 120 can transmit a fourth order message to the downstream trading partner system 150 or another entity, especially when the entity does not store or process orders with account tokens.

The fourth order message 170 may comprise an order and an account identifier. In an embodiment, a broker system 120 transmits a fourth order message 170 to a downstream trading partner system 150. An exemplary fourth order message is provided in FIG. 5.

The broker system 120 can also provide an intermediary device or system (e.g., proxy) to interact with the downstream trading partner system 150 in an Internet based environment. As with upstream trading partners, the broker system 120 can either provide a new system or integrate the system with an existing merchant ordering system API. This allows the downstream trading partner system 150 to interact with the broker system, but not implement substantial alterations to its processing. The broker system 120 can step in for the merchant ordering system and provide a confidential account identifier to the downstream trading partner system 150. Thus, the merchant ordering system 140 can initialize a payment with a token, the broker system can interact with the tokenization service system 130 to de-tokenize the token, and the broker system 120 can provide the de-tokenized order to the downstream trading partner system 150 for order and payment processing. The hosted web page may be a web-service API, HOP, SOP, batch file, or other similar system. In an embodiment, the tokenization service system 130 may be provided with payment services.

Figure 2:
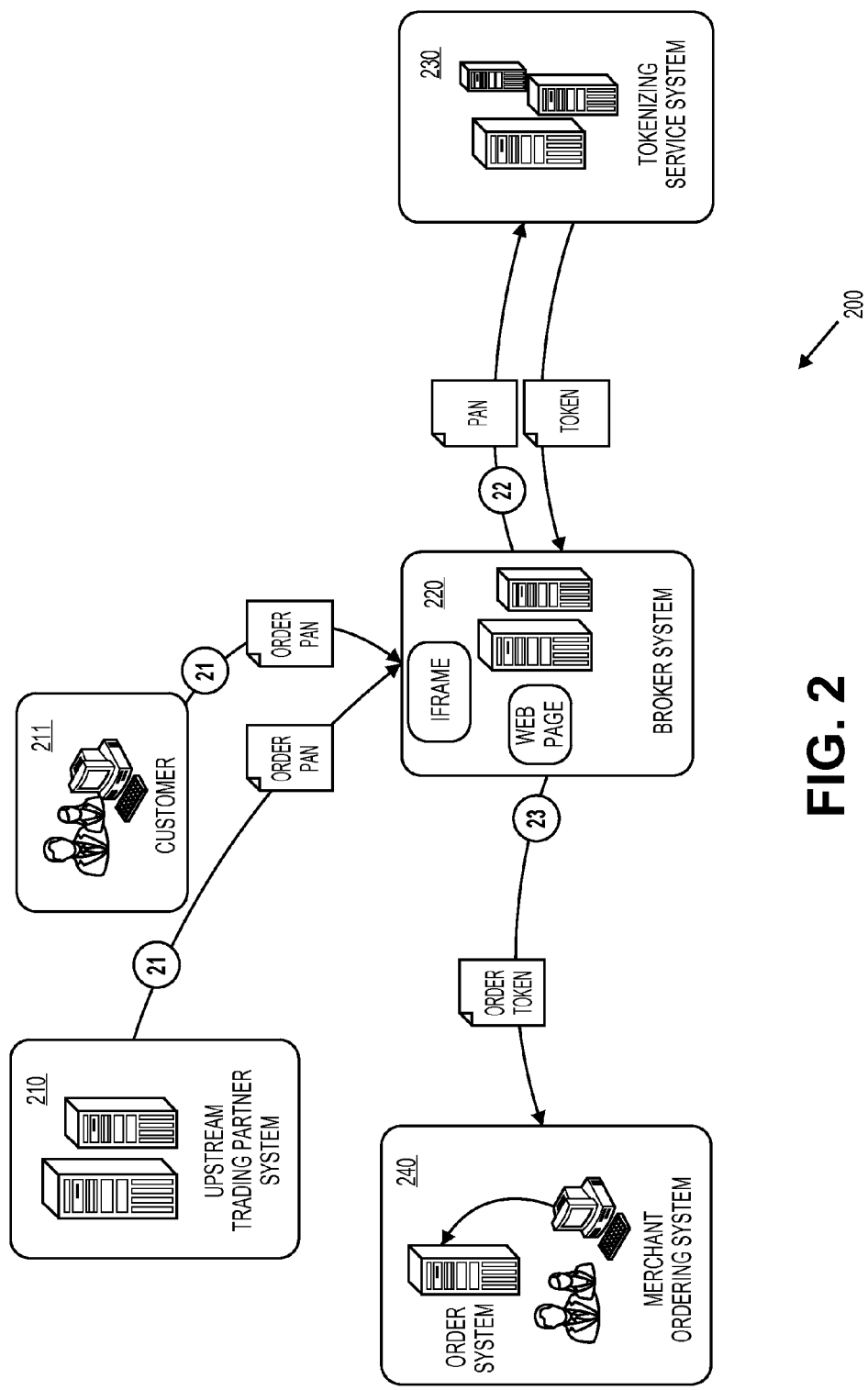
FIG. 2 shows a block diagram of a system with a hosted IFRAME according to an embodiment of the invention.

FIG. 2 shows a block diagram of a system with a hosted IFRAME according to an embodiment of the invention. The system 200 may include an upstream trading partner system 210 or customer 211 that submits an order message to a broker system 220.

At step 21, the broker system 220 can accept the order message through a hosted IFRAME. The order message may comprise an order and confidential account identifier. The hosted, embeddable IFRAME may also translate data as is it transferred between entities.

At step 22, the broker system 220 can transmit the account identifier (e.g., primary account number) to a tokenization service system 230 so that the tokenization service system can convert the account identifier to an account token. The tokenization service system can transmit the token back to the broker system 220.

At step 23, the broker system 220 can transmit the order message to the merchant ordering system 240. The order message may comprise an order and account token. The broker system 220 can also interact with the merchant ordering system through the hosted IFRAME. The hosted IFRAME can interact with the trading partners and customers to accept orders that use confidential account identifiers, tokenize the confidential account identifier contained in the order, and display the orders for the merchant ordering system. The broker system can also provide a hosted web page to the merchant ordering system customer service representatives. The hosted webpage can accept tokens and display the confidential account identifier or other payment information.

The broker system 220 may also implement a transaction decision engine in order to accept payment requests from the merchant ordering system's proxy. In an embodiment, the transaction decision engine can invoke the tokenization service to tokenize/de-tokenize payment data. The transaction decision engine may invoke an appropriate endpoint for order processing, so that the orders from the upstream trading partner systems can be routed to the merchant ordering system using the merchant ordering system API. Also, the orders that come from the merchant ordering system 240 can be routed to a downstream trading partner system (not shown in FIG. 2) using the downstream trading partner API. Further, the orders that originate with the hosted IFRAME can be sent to the merchant ordering system 240 for processing. The transaction decision engine may also translate data formats as data is transmitted between entities.

In one embodiment of the invention, the broker system can post payment with the token to the merchant ordering system 240. In another embodiment, a merchant ordering system customer service representative can enter an order with the token into the broker system's hosted webpage. The broker system 220 may call or send a request to the tokenization service system 230 to retrieve the confidential account identifier. The tokenization service system 230 can return the confidential account identifier to the broker system 220. The broker system 220 can display the order with the confidential account identifier to the merchant ordering system's customer service representative. The merchant ordering system customer service representative can then enter the order into the merchant ordering system or other order processing system.

Figure 3:
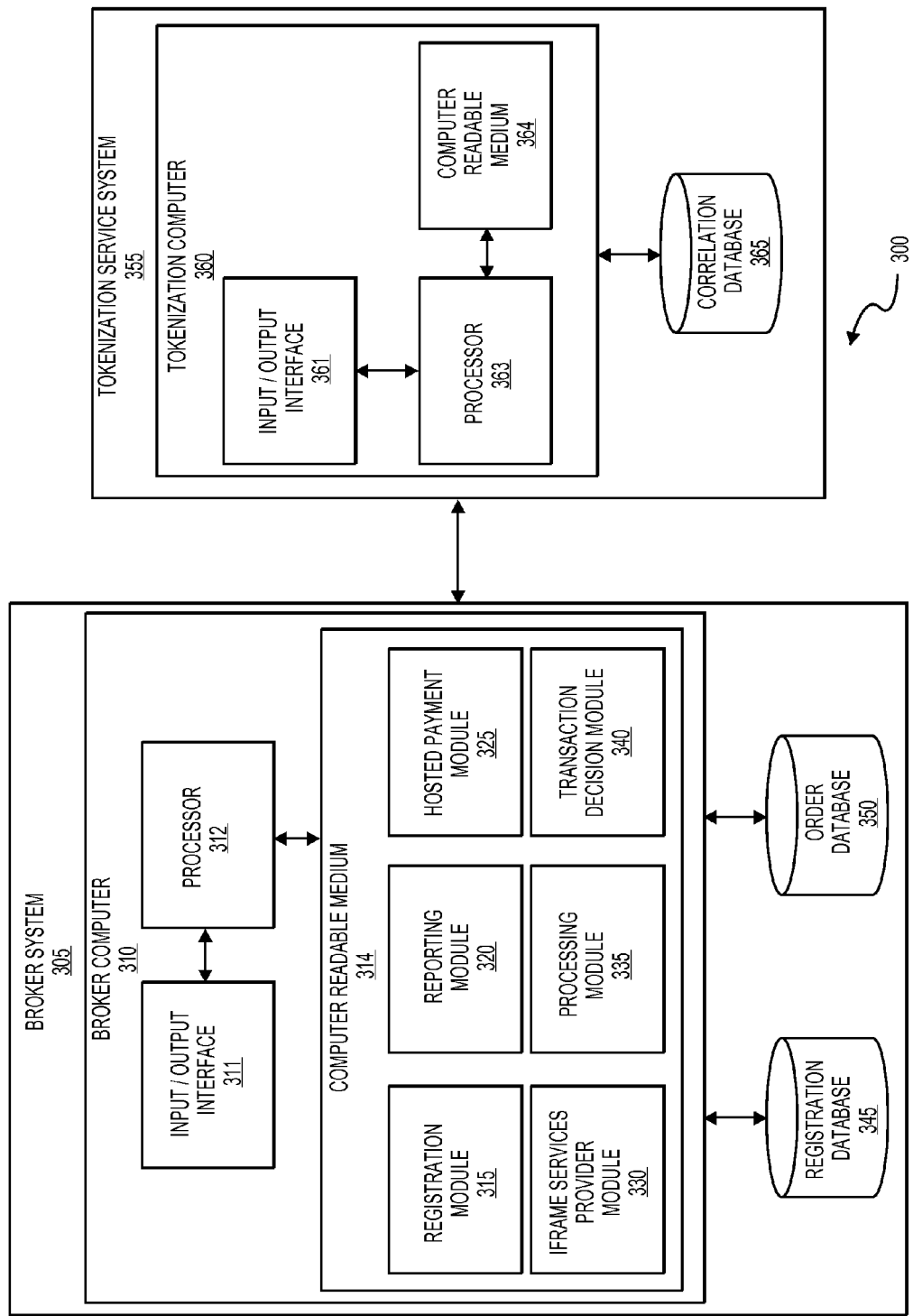
FIG. 3 shows a block diagram of a broker system and tokenization service system according to an embodiment of the invention.

FIG. 3 shows a block diagram of a broker system 305 and tokenization service system 355 according to an embodiment of the invention. The two components may form a subsystem 300. The broker system 305 can be coupled with and in operative communication with the tokenization service system 355. In other embodiments, the tokenization service system 355 can be implemented as one or more modules or databases within the broker system 305.

The broker system 305 can contain a broker computer 310. The broker computer 310 can comprise a processor 312 and a computer readable medium 314 coupled to the processor 312. The computer readable medium 314 can comprise code executable by the processor for implementing a method comprising receiving an order message (e.g., a third order message) comprising an order and an account token, initiating a detokenization process to detokenize the account token and to form an account identifier, generating a fourth order message with the order and account identifier, and transmitting the fourth order message to a downstream trading partner computer.

The broker computer 310 can include an input/output interface 311, processor 312, and computer readable medium 314. The computer readable medium 314 may store computer code for a plurality of modules. An input/output interface 311 can be coupled to the processor 363 as well. This may be used to as an interface to receive and/or transmit data. It may comprise any suitable hardware or software The processor 312 may be configured to execute the code stored in the computer readable medium 314 to implement the various methods described herein. The computer readable medium 314 can embodied by one or more memory devices, and may comprise an operating system, and several software modules. Examples of modules may include a registration module 315, reporting module 320, hosted payment module 325, IFRAME services provider module 330, processing module 335, and transaction decision module 340.

The processing module 335 may be implemented to process an order message for the broker system 305. The processing module 335 can process order messages, and may the parse the information in them and store the data associated with them in appropriate databases. For example, the processing module 335 can receive an order message from an upstream trading partner, parse the message, extract the order information from the order message, and add information from the order message to the order database 350. The processing module 335, working with the processor 312, may also transmit an account identifier to a tokenization service system 355 to initiate a tokenization process.

The registration module 315 can manage registration information about a merchant ordering system (e.g., name, IP address) by adding, deleting, or updating information about the merchants in the registration database 345. The registration database 345 can maintain and store information about merchants, trading partners, or relevant entities and systems.

The broker system 305 can also contain an order database 350. The broker computer 310 may be coupled to the order database 350. The order database may maintain and store orders, account tokens and account identifiers. In some embodiments, the processing module 335 may extract information from an order message and add the order information to the order database 350. Also, the data contained in the order database can be used by the reporting module 320 to generate reports. Examples of the data contained in the order database can be found in FIG. 4.

The reporting module 320 can process data in the order database 350 and provide reports to entities, including the merchant ordering system. For example, the merchant may want a list of all orders that were received from an upstream trading partner in the month of September. The reporting module could query the order database, generate a report that summarized the data retrieved from the order database, and provide the report to the processing module. The processing module 335, working with the processor 312, may then transmit the report to the merchant order system via a network.

The transaction decision module 340, working with the processor 312, can help initiate a payment transaction and manage the transaction. In an embodiment, the transaction decision module 340 can accept payment requests from various services coupled to the broker system 305. The transaction decision module 340 can invoke the tokenization service system 355 to initiate tokenization or detokenization of payment data.

The hosted payment module 325 can manage information received through a hosted order page (HOP) or a silent order page (SOP) that allows the secure transmission of account identifiers and other confidential payment information. An example of a hosted order page is provided in FIG. 9.

When a hosted IFRAME is used, the IFRAME services provider module 330 can process and manage information received through a hosted IFRAME that allows the secure transmission of account identifiers and other confidential payment information. A hosted IFRAME can be implemented in a similar way to a hosted order page, as provided in FIG. 9.

The tokenization service system 355 can comprise a tokenization computer 360 and correlation database 365. The tokenization computer 360 may be coupled to the correlation database 365.

The tokenization computer 360 can receive instructions from a broker system 305 or other system to tokenize an account identifier. The tokenization computer 360 may comprise an input/output interface 361, a processor 363, and a computer readable medium 364. In an embodiment, the computer readable medium 364 may be coupled to the processor 363 and the computer readable medium 364 can comprise code executable by the processor 363 for implementing the methods described herein. It should be appreciated that the tokenization computer 360 can create a unique token for each account stored in the correlation database 365, with one token for an account number used with a particular merchant.

In an embodiment, one token can be shared for the purposes of a particular trading partner network between the upstream trading partner system, merchant ordering system, and downstream trading partner system. Thus, when an account identifier arrives at the tokenization service system 355 for a particular merchant, the tokenization computer 360 can determine if an account token exists for the method of payment and the tokenization.

The correlation database 365 can map a token with an account identifier. The token may be retrieved from the correlation database 365 by the tokenization computer 360 and transmitted to the broker system 305. The tokens may be sent from the tokenization service system 355 to the broker system 305 according to any means known to those having ordinary skill in the art.

FIG. 4 shows sample data contained in an order database according to an embodiment of the invention. The order database 410 may comprise several tables or sections, including an order table 420, account identifier table 430, and account token table 440. The order database 410 can be implemented in other variations of databases and is not necessarily limited to an, e.g., relational database.

The order table 420 can include data relating to information contained in orders. For example, the order table can include a customer number as a unique identifier for a particular customer in the order database, which may be similar to a primary key. As shown in rows 421 and 422, the customer number would be "SMITH-J-1000." The order table 420 can also contain particular information about the order, including item numbers, description of the items in an order, quantity of each item purchased, price, or total cost. For example, as shown in row 421, the order table 420 can comprise a customer number ("SMITH-J-1000"), item ("TEL-1000"), description ("Establish Telephone Lines"), quantity ("5"), price ("1000.00"), and total cost ("5000.00"). In another example, as shown in row 422, the order table 420 can include a customer number ("SMITH-J-1000"), item ("POL-1000"), description ("Establish Telephone Pole"), quantity ("1"), price ("1000.00"), and total cost ("1000.00").

The account identifier table 430 may also include the primary key that correlates an entry in the account identifier table with an entry in the order table 420 and account token table 440. The account identifier table 430 can contain information related to an account identifier, including an expiration date, CVV, and the like. For example, as shown in row 431, the account identifier table 430 can comprise a customer number ("SMITH-J-1000"), account identifier ("4147 2900 0001 1000"), expiration date ("08/2013"), and CVV ("123").

The account token table 440 can contain information related to an account token and primary key information. When the account token is first used in an order with a merchant, the account token may be generated by the tokenization service system 355, transmitted to the order database 410 via the broker system 305, and stored in the order database 410. When another order message is received that includes the same account identifier correlated to the account token, the broker system may not need to request a new token from the tokenization service system. Instead, the broker system can query the order database 410 using the account identifier or other information that correlates to the token in order to retrieve the token. For example, as shown in row 441, the account token table 440 may include a customer number ("SMITH-J-1000"), parties involved ("John Smith, Inc.; Merchant; Installer"); and the token associated with the parties ("1234ABCD9876DCBA1234ABCD9876DCBA1234-ABCD9876DCBA").

Figure 5:
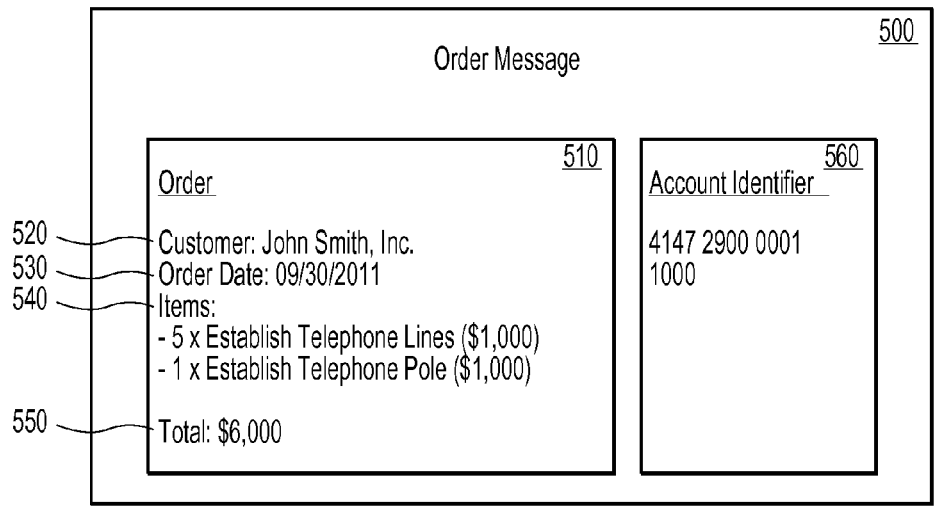
FIG. 5 shows an example of a first order message transmitted between an upstream trading partner and a broker system according to an embodiment of the invention.

FIG. 5 shows an example of a first order message transmitted between an upstream trading partner and a broker system according to an embodiment of the invention. In an embodiment, FIG. 5 may also include an example of a fourth order message transmitted between a broker system and a downstream trading partner. The first order message 500 may include an order 510 and an account identifier 560. The order 510 may include information relevant to identifying an order. For example, the order 510 can include a customer's name 520, order date 530, items to be ordered 540 and the total cost for the order 550.

The first order message 500 may also contain an account identifier 560. The account identifier can identify the true account number or other confidential information. The downstream trading partner, for example, can use the account identifier to initiate a payment transaction for goods and services.

Figure 6:
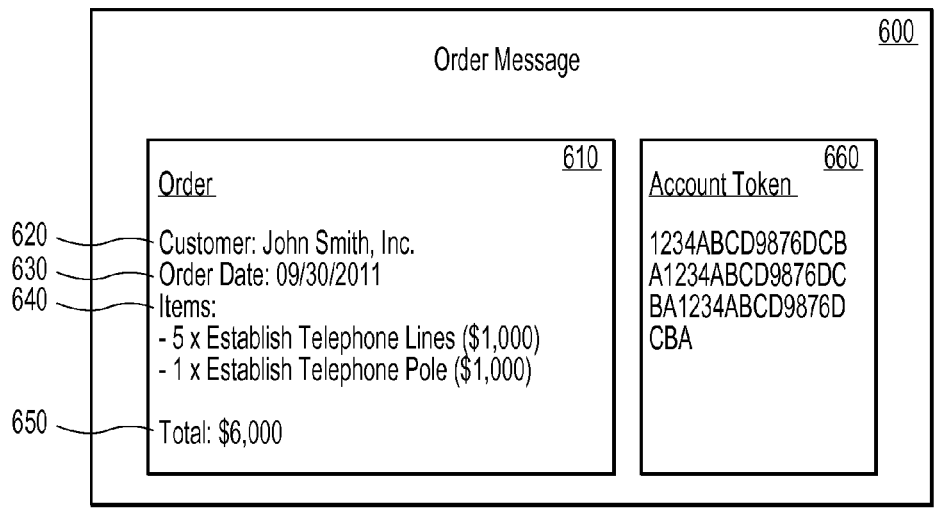
FIG. 6 shows an example of a second order message transmitted between a broker system and a merchant ordering system according to an embodiment of the invention.

FIG. 6 shows an example of a second order message transmitted between a broker system and a merchant ordering system according to an embodiment of the invention. In an embodiment, FIG. 6 may also include an example of a third order message transmitted between a merchant ordering system and a broker system. The second order message 600 may include an order 610 and an account token 660. The order 510 may be substantially similar to the order in the first order message 500 and comprise substantially similar information. For example, the order 610 can consist of a customer's name 620, order date 630, items to be ordered 640 and the total cost for the order 650.

The second order message 600 may also contain an account token 660. The account token can mask the true account identifier. The merchant, for example, can use the account token to process the order for goods and services without using the actual account number.

Figure 7:
FIG. 7 shows an example of a reply message transmitted from a merchant ordering system according to an embodiment of the invention.

FIG. 7 shows an example of a reply message transmitted from a merchant ordering system according to an embodiment of the invention. In an embodiment, the reply message 700 originates from the merchant ordering system and is transmitted to the broker system, which acts as a pass through or proxy service to send the reply message to the upstream trading partner system.

II. Exemplary Methods of Upstream and Downstream Data Conversion

Figure 8:
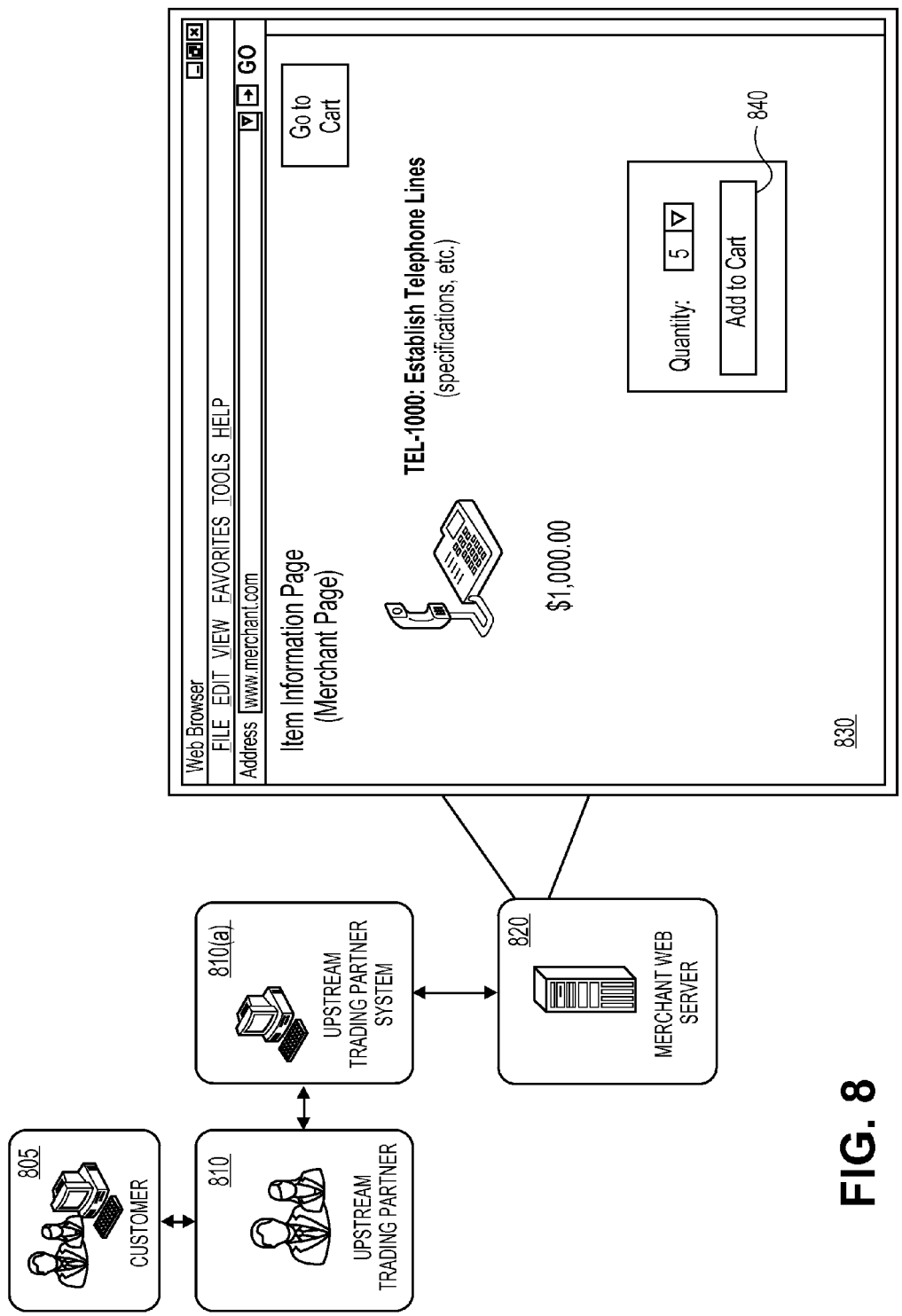
FIG. 8 is an illustration of a merchant page used by an upstream trading partner to submit an order according to an embodiment of the invention.

FIG. 8 is an illustration of a merchant page used by an upstream trading partner to submit an order according to an embodiment of the invention. The method may begin when a customer 805 places an order with an upstream trading partner. The upstream trading partner 810, via an upstream trading partner system 810(a), can access a merchant web page via a merchant web server 820. While visiting the merchant page 830, the upstream trading partner can view the details for a particular item. For example, as illustrated in FIG. 8, the upstream trading partner may view the details of establishing new telephone lines. Further, while visiting the merchant page, the upstream trading partner may select the "Add to Cart" button 840 to add an item to its electronic shopping cart on behalf of the customer 805.

Figure 9:
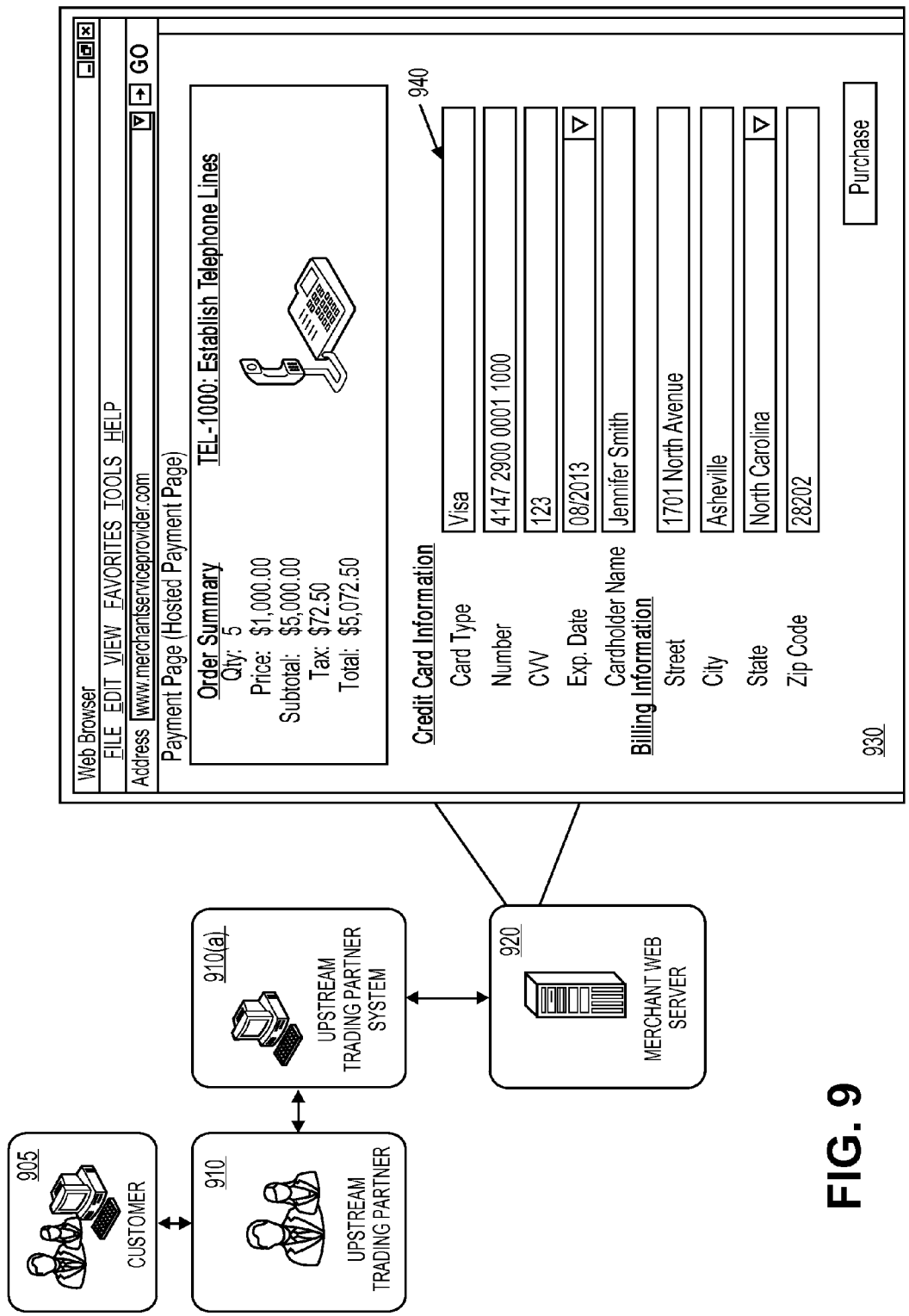
FIG. 9 is an illustration of a hosted IFRAME used by an upstream trading partner to submit an order according to an embodiment of the invention.

FIG. 9 is an illustration of a hosted IFRAME used by an upstream trading partner to submit an order according to an embodiment of the invention. The method may begin when a customer 905 places an order with an upstream trading partner. The upstream trading partner 910, via an upstream trading partner system 910(a), can access a merchant web page via a merchant web server 920. While visiting the merchant page 930, the upstream trading partner can provide confidential information 940. For example, the confidential information may include the consumer's payment details associated with the order, including an account identifier, billing information, etc. The hosted web page may transmit the order and account identifier to the broker system for processing.

Further details regarding a standard HOP or SOP that could be incorporated into the above-described system can be found in U.S. patent application Ser. Nos. 13/549,187 and 13/559,250, which are herein incorporated by reference in their entirety for all purposes.

III. Exemplary Computer Apparatus

Figure 10:
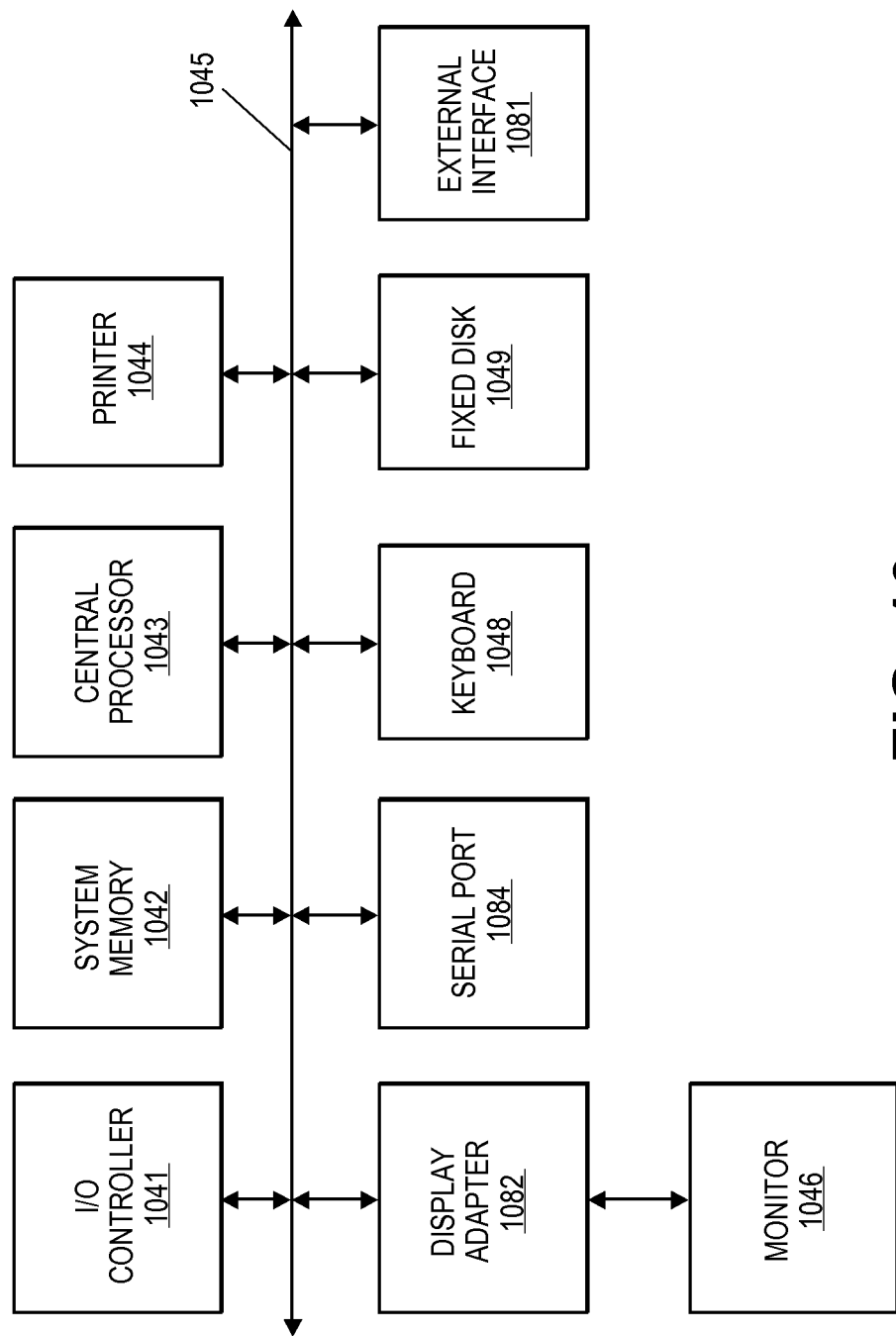
FIG. 10 shows examples of subsystems or components.

The various participants and elements described herein may operate one or more computer apparatuses to facilitate the functions described herein. Any of the elements in the above-described Figures, including any servers or databases, may use any suitable number of subsystems to facilitate the functions described herein. Examples of such subsystems or components are shown in FIG. 10. The subsystems shown in FIG. 10 are interconnected via a system bus 1045. Additional subsystems such as a printer 1044, keyboard 1048, fixed disk 1049 (or other memory comprising computer readable media), monitor 1046, which is coupled to display adapter 1082, and others are shown. Peripherals and input/output (I/O) devices, which couple to I/O controller 1041 (which can be a processor or other suitable controller), can be connected to the computer system by any number of means known in the art, such as serial port 1084. For example, serial port 1084 or external interface 1081 can be used to connect the computer apparatus to a wide area network such as the Internet, a mouse input device, or a scanner. The interconnection via system bus allows the central processor 1043 to communicate with each subsystem and to control the execution of instructions from system memory 1042 or the fixed disk 1049, as well as the exchange of information between subsystems. The system memory 1042 and/or the fixed disk 1049 may embody a computer readable medium.

Figure 11:
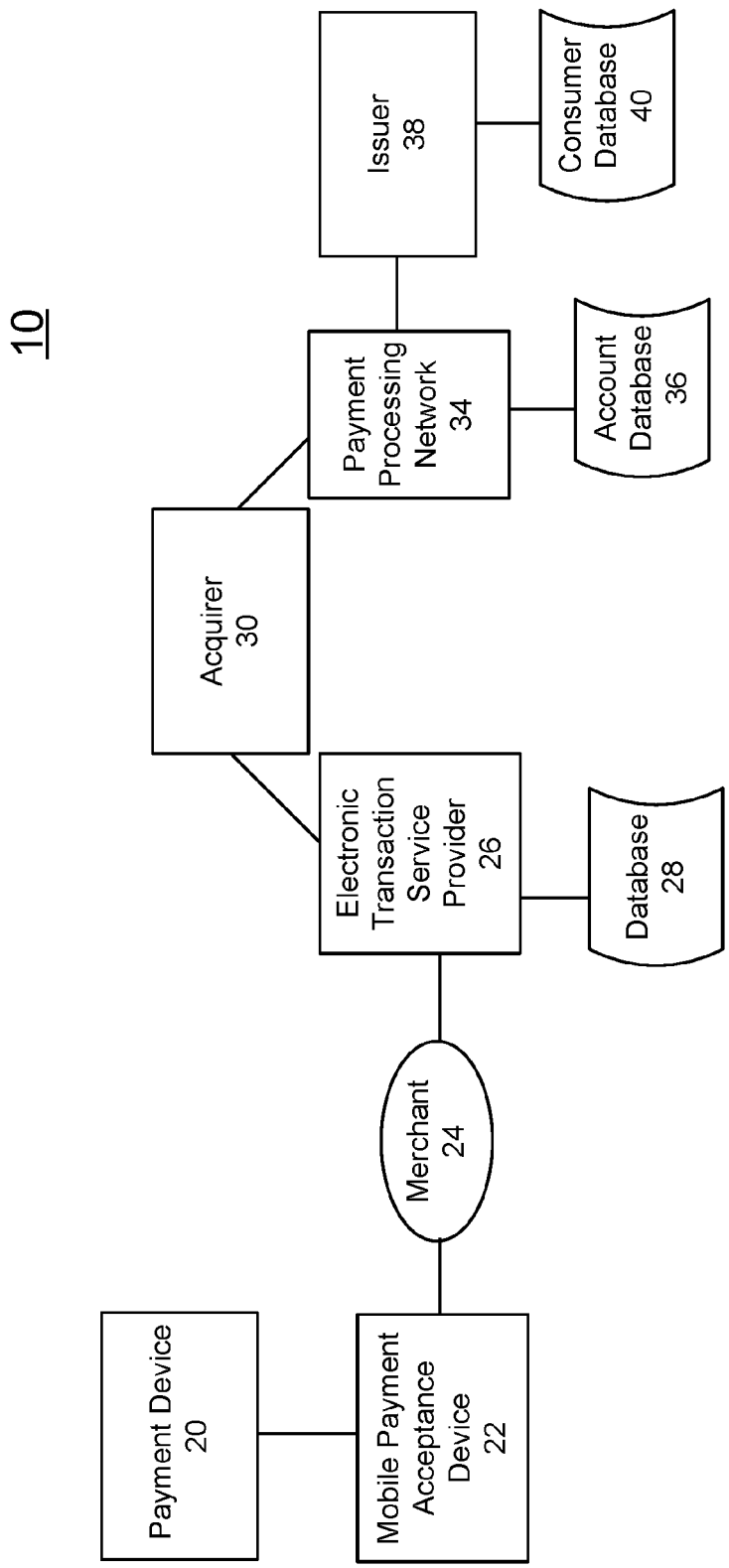
FIG. 11 shows a block diagram of a transaction processing system that may be used with some embodiments of the present invention.

FIG. 11 is a block diagram illustrating a transaction processing system 10 that may be used with some embodiments of the present invention.

FIG. 11 illustrates the primary functional elements that are typically involved in processing a payment transaction and in the authorization process for such a transaction. As shown in FIG. 11, in a typical payment transaction, a consumer wishing to purchase a good or service from a merchant uses a payment device 20 to provide payment transaction data that may be used as part of a consumer authentication or transaction authorization process. Payment device 20 may be a debit card, credit card, smart card, mobile device containing a contactless chip, computer, or other suitable form of device.

The portable payment device is presented to a mobile payment acceptance device 22 of a merchant 24. For example, the acceptance device 22 could be a device reader or point of sale (POS) terminal 22 which is able to access data stored on or within the payment device. In embodiments, the portable payment device communicates account/payment information to the merchant 24 via a "card not present" transaction over a communications network, such as a cellular network, the Internet, etc. The account data (as well as any required consumer data) is communicated to the merchant 24 and ultimately to an merchant service provider 26 (such as AUTHORIZE.NET). As part of the authentication or authorization process performed by the service provider, the service provider 26 may access database 28, which typically stores data regarding the customer/consumer/user (as the result of a registration process with the merchant, for example), the consumer's payment device, and the consumer's transaction history with the merchant. The database 28 may also include information about the merchant 24, such as a list of the merchant's approved mobile payment acceptances device 22. For example, upon receiving information about the payment device 20 from the merchant's mobile payment acceptance device 22, the service provider 26 may extract information that identifies the mobile payment acceptance device 22 and validate that information against a list of approved mobile payment acceptance devices. The service provider 26 typically communicates with acquirer 30 (which manages the merchant's accounts) as part of the overall authentication or authorization process. The service provider 26 and/or acquirer 30 provide data to payment processing network 34, which, among other functions, participates in the clearance and settlement processes that are part of the overall transaction processing.

Communication and data transfer between service provider 26 and payment processing network 34 is typically by means of an intermediary, such as acquirer 30. As part of the consumer authentication or transaction authorization process, payment processing network 34 may access account database 36, which typically contains information regarding the consumer's account payment history, chargeback or transaction dispute history, creditworthiness, etc. Payment processing network 34 communicates with issuer 38 as part of the authentication or authorization process, where issuer 38 is the entity that issued the payment device to the consumer and manages the consumer's account. Customer or consumer account data is typically stored in customer/consumer database 40 which may be accessed by Issuer 38 as part of the authentication, authorization or account management processes. Note that instead of, or in addition to being stored in account database 36, consumer account data may be included in, or otherwise part of customer/consumer database 40.

According to an embodiment, in standard operation, an authorization request message is created by the mobile payment acceptance device 22 during a consumer purchase of a good or service using a portable payment device. In some embodiments, the mobile payment acceptance device 22 of the merchant 24 may be a wireless phone or personal digital assistant that incorporates a contactless card or chip or payment acceptance application. The authorization request message is typically sent from the payment application of the mobile payment acceptance device 22 to the service provider 26, and then to the merchant's acquirer 30, to a payment processing network 34, and then to an issuer 38. An authorization request message can include a request for authorization to conduct an electronic payment transaction and data relevant to determining if the request should be granted as well as device identification information related to the mobile payment acceptance device 22, which the service provider 26 validates against the list of approved mobile payment acceptance devices 22. For example, it may include one or more of an account holder's payment account number, currency code, sale amount, merchant transaction stamp, acceptor city, acceptor state/country, etc. An authorization request message may be protected using a secure encryption method (e.g., 128-bit SSL or equivalent) in order to prevent unauthorized access to account or transaction data.

After the issuer receives the authorization request message, the issuer determines if the transaction should be authorized and sends an authorization response message back to the payment processing network to indicate whether or not the current transaction is authorized. The payment processing system then forwards the authorization response message to the acquirer. The acquirer then sends the response message to the service provider 26, which then sends the response message to the merchant's mobile payment acceptance device 22. The merchant is thus made aware of whether the issuer has authorized the transaction, and hence whether the transaction can be completed.

At a later time, a clearance and settlement process may be conducted by elements of a payment/transaction processing system. A clearance process involves exchanging financial details between an acquirer and an issuer to facilitate posting a transaction to a consumer's account and reconciling the consumer's settlement position. Clearance and settlement can occur simultaneously or as separate processes.

Payment processing network 34 may include a server computer. A server computer is typically a powerful computer or cluster of computers. For example, the server computer can be a large mainframe, a minicomputer cluster, or a group of servers functioning as a unit. In one example, the server computer may be a database server coupled to a web server. Payment processing network 34 may use any suitable combination of wired or wireless networks, including the Internet, to permit communication and data transfer between network elements. Among other functions, payment processing network 34 may be responsible for ensuring that a consumer is authorized to conduct a transaction (via an authentication process), confirm the identity of a party to a transaction (e.g., via receipt of a personal identification number), confirm a sufficient balance or credit line to permit a purchase, or reconcile the amount of a purchase with the consumer's account (via entering a record of the transaction amount, date, etc.).

The payment device 20 may take one of many suitable forms. As mentioned above, the portable payment device can be a mobile device that incorporates a contactless element such as a chip for storing payment information (e.g., a BIN number, account number, etc.) and a near field communications (NFC) data transfer element such as an antenna, a light emitting diode, a laser, etc. The portable payment device may also include a keychain device (such as the Speedpass™ commercially available from Exxon-Mobil Corp.), etc. The device containing the contactless card or chip, or other data storage element may be a cellular (mobile) phone, personal digital assistant (PDA), pager, transponder, or the like. The portable payment device may also incorporate the ability to perform debit functions (e.g., a debit card), credit functions (e.g., a credit card), or stored value functions (e.g., a stored value or prepaid card).

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The present invention can be implemented in the form of control logic in software or hardware or a combination of both. The control logic may be stored in an information storage medium as a plurality of instructions adapted to direct an information processing device to perform a set of steps disclosed in embodiments of the present invention. Based on the disclosure and teachings provided herein, a person of ordinary skill in the art will appreciate other ways and/or methods to implement the present invention.

In embodiments, any of the entities described herein may be embodied by a computer that performs any or all of the functions and steps disclosed.

One or more features from any embodiment may be combined with one or more features of any other embodiment without departing from the scope of the invention.

A recitation of "a", "an" or "the" is intended to mean "one or more" unless specifically indicated to the contrary.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

All patents, patent applications, publications, and descriptions mentioned above are herein incorporated by reference in their entirety for all purposes. None is admitted to be prior art.

What is claimed is:

1. A method comprising:
receiving via a network, at a broker computer that includes a server computer with an interface for receiving and transmitting order messages, a second order message comprising an order and an account token, wherein the second order message is received from a merchant ordering system, and wherein a first order message is received at the broker computer that originates from an upstream trading partner computer prior to receiving the second order message from the merchant ordering system at the broker computer;
initiating, at the broker computer, a detokenization process to detokenize the account token and to form an account identifier;
generating, by the broker computer, a third order message with the order and the account identifier in response to receiving the second order message; and
transmitting, by the broker computer to a downstream trading partner computer, the third order message, wherein the downstream trading partner computer initiates a payment transaction by transmitting the account identifier to an authorization computer for authorization in response to receiving the third order message.

2. The method of claim 1, wherein the order is a second order, payment transaction is a second payment transaction, the account token is a second token, and wherein the method further comprises:
receiving the first order message comprising a first order and the account identifier from the upstream trading partner computer;
initiating a tokenization process to tokenize the account identifier and to form a second account token;
generating the second order message with the first order and the second account token; and
transmitting the second order message to a merchant ordering system wherein the merchant ordering system initiates a first payment transaction.

3. The method of claim 1, wherein the account identifier is decrypted and the method further comprises:
after forming the account identifier, encrypting the account identifier.

4. The method of claim 1, wherein the account identifier is a primary account number.

5. The method of claim 1, wherein the broker computer receives the second order message via a hosted webpage.

6. A method comprising:
generating, at a merchant ordering system, a second order message comprising an order and an account token, wherein a first order message is transmitted via a network from a broker computer to the merchant ordering system, wherein the first order message originates from an upstream trading partner computer prior to generating the second order message at the merchant ordering system; and
transmitting, to a broker computer, the second order message, wherein the broker computer initiates a detokenization process to detokenize the account token and to form an account identifier in response to receiving the second order message, wherein the broker computer generates a third order message with the order and the account identifier, wherein the broker computer transmits the third order message via the network to a downstream trading partner computer, and wherein the downstream trading partner computer initiates a payment transaction in response to receiving the third order message by transmitting the account identifier to an authorization computer for authorization.

7. The method of claim 6, wherein the order is a second order, the account token is a second account token, and the payment transaction is a second payment transaction, and wherein the method further comprises:
receiving, at the merchant ordering system, the second order message comprising a first order and a first account token, wherein the second order message is received from the broker computer.

8. The method of claim 7, wherein the third order message is received after the first order message.

9. The method of claim 6, wherein the account identifier is a primary account number.

10. The method of claim 6, wherein the broker computer hosts a webpage for the merchant ordering system to receive the first order message.

11. An apparatus comprising:
a computer coupled to a database, wherein the computer comprises a processor and a computer-readable medium coupled to the processor, the computer-readable medium comprising code executable by the processor for implementing a method comprising:
receiving via a network, at a broker computer that includes a server computer with an interface for receiving and transmitting order messages, a second order message comprising an order and an account token, wherein the second order message is received from a merchant ordering system, and wherein a first order message is received at the broker computer that originates from an upstream trading partner computer prior to receiving the second order message from the merchant ordering system at the broker computer;
initiating, at the broker computer, a detokenization process to detokenize the account token and to form an account identifier;
generating, by the broker computer, a third order message with the order and the account identifier in response to receiving the second order message; and
transmitting, by the broker computer to a downstream trading partner computer, the third order message, wherein the downstream trading partner computer initiates a payment transaction by transmitting the account identifier to an authorization computer for authorization in response to receiving the third order message.

12. The apparatus of claim 11, wherein the order is a second order, payment transaction is a second payment transaction, the account token is a second token, and wherein the method further comprises:
receiving the first order message comprising a first order and the account identifier from the upstream trading partner computer;
initiating a tokenization process to tokenize the account identifier and to form a second account token;
generating the second order message with the first order and the second account token; and
transmitting the second order message to a merchant ordering system, wherein the merchant ordering system initiates a first payment transaction.

13. The apparatus of claim 11, wherein the account identifier is decrypted and the method further comprises:
after forming the account identifier, encrypting the account identifier.

14. The apparatus of claim 11, wherein the account identifier is a primary account number.

15. The apparatus of claim 11, wherein the broker computer receives the second order message via a hosted webpage.

16. An apparatus comprising:
a computer coupled to a database, wherein the computer comprises a processor and a computer-readable medium coupled to the processor, the computer-readable medium comprising code executable by the processor for implementing a method comprising:
generating, at a merchant ordering system, a second order message comprising an order and an account token, wherein a first order message is transmitted via a network from a broker computer to the merchant ordering system, wherein the first order message originates from an upstream trading partner computer prior to generating the second order message at the merchant ordering system; and
transmitting, to a broker computer, the second order message, wherein the broker computer initiates a detokenization process to detokenize the account token and to form an account identifier in response to receiving the second order message, wherein the broker computer generates a third order message with the order and the account identifier, wherein the broker computer transmits the third order message via the network to a downstream trading partner computer, and wherein the downstream trading partner computer initiates a payment transaction in response to receiving the third order message by transmitting the account identifier to an authorization computer for authorization.

17. The apparatus of claim 16, wherein the order is a second order, the account token is a second account token, and the payment transaction is a second payment transaction, and wherein the method further comprises:
receiving, at the merchant ordering system, the second order message comprising a first order and a first account token, wherein the second order message is received from the broker computer.

18. The apparatus of claim 17, wherein the third order message is received after the first order message.

19. The apparatus of claim 16, wherein the account identifier is a primary account number.

20. The apparatus of claim 16, wherein the broker computer hosts a webpage for the merchant ordering system to receive the first order message.

21. The apparatus of claim 11, wherein the broker computer further comprises a processing module that parses and extracts order information from order messages.

22. The method of claim 1, wherein the third order message is generated in response to receiving the second order message, and wherein the second ordered message is received from the merchant ordering system via the network.

23. The method of claim 1, wherein the upstream trading partner computer places the order for goods or services with the merchant ordering system, and wherein the downstream trading partner computer accepts the order for the goods or the services from the merchant ordering system.

* * * * *